United States Patent [19]

Hellmer et al.

[11] 4,117,100

[45] Sep. 26, 1978

[54] PROCESS FOR REDUCTION OF SULFUR DIOXIDE TO SULFUR

[75] Inventors: Lars Hellmer, Widdersdorf; Gerald Koller; Ghazi Rashid Al Muddarris, both of Cologne; Kuldip Kumar Sud, Weiden, all of Fed. Rep. of Germany

[73] Assignee: Davy Powergas GmbH, Fed. Rep. of Germany

[21] Appl. No.: 782,360

[22] Filed: Mar. 29, 1977

[30] Foreign Application Priority Data

Mar. 29, 1976 [DE] Fed. Rep. of Germany ....... 2613343

[51] Int. Cl.² ............................................. C01B 17/04
[52] U.S. Cl. .................................. 423/569; 423/574 R
[58] Field of Search ............... 423/563, 564, 569, 570, 423/574, 576

[56] References Cited

U.S. PATENT DOCUMENTS

| 1,917,685 | 7/1933 | Bacon et al. | 423/569 |
|---|---|---|---|
| 3,199,955 | 8/1965 | West et al. | 423/570 |
| 3,752,877 | 8/1973 | Beavon | 423/564 X |
| 3,798,315 | 3/1974 | Nicklin | 423/574 |
| 3,927,191 | 12/1975 | Archambault et al. | 423/570 |
| 3,970,744 | 7/1976 | Riesenfeld | 423/574 |
| 4,039,621 | 8/1977 | Constantini | 423/564 X |

FOREIGN PATENT DOCUMENTS

| 223,904 | 11/1957 | Australia | 423/574 |
|---|---|---|---|
| 760,064 | 12/1933 | France | 423/569 |
| 2,365,116 | 7/1974 | Fed. Rep. of Germany | 423/574 |

*Primary Examiner*—G. O. Peters
*Attorney, Agent, or Firm*—Bernard & Brown

[57] ABSTRACT

In accordance with the invention sulfur dioxide in sulfur dioxide-containing gases is converted under selective conditions to provide elemental sulfur in an efficient and economically-acceptable manner for present day industrial operations. The conversion involves the thermal reduction of sulfur dioxide in a zone at relatively moderate temperatures maintained by the combustion of carbonaceous fuel in the zone to provide elemental sulfur and to provide a gaseous thermal reduction effluent which is acceptable for further processing to recover additional sulfur values therefrom.

20 Claims, 2 Drawing Figures

PROCESS FOR REDUCTION OF SULFUR DIOXIDE TO SULFUR

This invention relates to a process for recovering elemental sulfur from sulfur dioxide-containing gases involving thermally reducing the sulfur-dioxide containing gases to provide elemental sulfur.

Sulfur dioxide-containing gases are produced in a number of industrial processes, e.g., through the roasting of sulfide-containing ores or the combustion of sulfur-containing carbonaceous materials such as oil and coal. In operations such as the roasting of ores, the sulfur dioxide-containing gases have sufficient amounts of sulfur dioxide for processing into sulfuric acid and the efficiency of modern processes is sufficiently high that the exhaust gases from sulfuric acid processing units have only small amounts of sulfur dioxide. On the other hand, the combustion of sulfur-containing carbonaceous fuels provides an effluent having a sulfur dioxide content which is too low for direct utilization in sulfuric acid processing units, but yet too high for exhausting to the atmosphere. A number of processes are known for recovering sulfur dioxide from waste gas streams, e.g., flue gas from carbonaceous fuel combustion, which employ absorption of adsorption agents to recover the sulfur dioxide. These processes are cyclic in that the absorption of adsorption agents for the sulfur dioxide can be regenerated, resulting in the liberation of sulfur dioxide-containing gases, and the regenerated absorption or adsorption agents can be recycled to the sulfur dioxide recovery unit. The sulfur dioxide-containing gases evolved during regeneration generally have a much higher concentration of sulfur dioxide than that of the gas from which the sulfur dioxide was recovered. While such sulfur dioxide recovery processes may enable direct utilization of the gases evolved during regeneration in a sulfuric acid processing unit, sulfuric acid is generally not needed at the location at which the sulfur dioxide is recovered. It is therefore desirable to reduce the sulfur dioxide to elemental sulfur since sulfur can be stored and transported less expensively than sulfuric acid.

A number of processes are known for reducing sulfur-dioxide containing gases to elemental sulfur. One proposed process is disclosed in German patent application No. 2,327,616 and VGB-Kraftwerkstechnik 53, pages 521 to 525 (1973). The German patent application discloses the reduction of sulfur dioxide with methane in the presence of a reduction catalyst at a temperature of about 760° to 1000° C. The elementary sulfur which is formed, is separated from the gases and the gases are further catalytically processed in Claus units to provide elemental sulfur from sulfur dioxide and hydrogen sulfide. Since the catalytic reduction is performed at relatively high temperatures, damages to or losses of the reduction catalyst occur very readily. Moreover, to obtain the desired conversion of sulfur values to sulfur during reduction, the temperature must be precisely controlled.

In German patent application No. 2,365,116, a process for reducing sulfur dioxide-containing gases with hydrogen at temperatures above about 650° C. without the necessity of using a reduction catalyst is disclosed. The product gases from the reduction contain sulfur, hydrogen sulfide, sulfur dioxide and carbon disulfide. The hydrogen employed in this process must be relatively pure and can contain only small amounts of methane, and thus is relatively expensive. Suitable hydrogen-rich gases may be obtained through the catalytic reforming of natural gas. Hydrogen is employed as the reducing agent since hydrocarbons may tend to form soot which can discolor the sulfur product.

In *Industrial Engineering and Chemistry*, Volume 42, pages 2249 to 2253 (1950), there is disclosed a process for reducing sulfur dioxide gases from a copper ore roaster with natural gas without employing a reduction catalyst. Temperatures above 1250° C. are employed to insure oxidation of carbon values in the natural gas and avoid obtaining a dark-colored sulfur product.

Applications Ser. No. 622,821, filed Oct. 16, 1975, and Ser. No. 618,285, filed Sept. 30, 1975, by Joachim Fechner, et al., disclose a process for producing elemental sulfur from sulfur dioxide-containing gases involving the thermal reduction of sulfur dioxide wherein a hydrocarbon fuel is combusted in a thermal reduction zone to provide heat for the thermal reduction.

An object of the present invention is the provision of an efficient process for converting sulfur dioxide to elemental sulfur in amounts required in, and economically acceptable for, present day industrial operations. Another object is to provide such a process which can tolerate variances in operating conditions within a given range without major equipment adaptations. Another object is to provide a process which can be utilized in coacting phases to provide, at acceptable economics, the capacity required in presentday industrial operations. Another object is to provide a process which can efficently integrate coacting phases including a combustion phase to provide reducing conditions for the thermal reduction of sulfur dioxide to elemental sulfur, a thermal reduction phase, and a catalytic contact phase to enhance the production of elemental sulfur.

In accordance with this invention a process is provided for converting sulfur dioxide in sulfur dioxide-containing gases under selective conditions to elemental sulfur involving the thermal reduction of sulfur dioxide to elemental sulfur and to provide a gaseous thermal reduction effluent which is acceptable for further processing, e.g., by catalytic conversion, to recover additional sulfur values therefrom. The thermal reduction is conducted in a thermal reduction zone under certain conditions advantageously including the use of relatively moderate temperatures maintained by the combustion of carbonaceous fuel in the thermal reduction zone, the presence of certain amounts of reducing agent, maintaining certain amounts of water vapor in the sulfur dioxide-containing gases, and certain residence times in the thermal reduction zone of the gases undergoing thermal reduction. The process of this invention provides for the efficient and economically-acceptable conversion of sulfur dioxide in sulfur dioxide-containing gases to elemental sulfur for present day industrial operations. Thus, advantageously, a carbonaceous, e.g., carbon monoxide or hydrocarbon-containing material, can be employed in the thermal reduction zone while providing an essentially carbon-free sulfur product and avoiding the production of a dark-colored sulfur product. Hence, by this invention, an acceptable sulfur product can be obtained utilizing thermal reduction without employing excessively high temperatures even though hydrocarbon materials may be present in the thermal reduction zone. Moreover, relatively inexpensive gaseous or liquid fuels including fuel oil can be combusted within the thermal reduction zone to maintain thermal reduction conditions without unduly affecting the sulfur product.

In the process of this invention, a fuel is combusted with up to about a sufficient amount of an oxygen-containing gas for complete combustion of the fuel on a stoichiometric basis within a thermal reduction zone to provide combustion gases and heat suitable to maintain thermal reduction temperatures in the thermal reduction zone. A sulfur dioxide-containing gas which contains at least 10 volume percent sulfur dioxide and advantageously has an $H_2O$ content, i.e., water vapor, or steam, content of about 5 to 90 volume percent, based on the gases, is introduced into the thermal reduction zone under certain conditions and commingled with the combustion gases, said certain conditions including wherein the combustion gases contain less than about 0.2 volume percent free or molecular oxygen. Under the conditions of the thermal reduction of this invention, the presence of the water in the sulfur dioxide-containing gases may serve to abate the presence of carbon in the thermal reduction gases which may discolor the sulfur product by reacting with the carbon to form hydrogen and carbon monoxide. Generally, increased amounts of water in the thermal reduction zone have been found to enhance the conversion of carbon to carbon monoxide. Although the presence of water may enhance the production of, e.g., carbonyl sulfide, the process of this invention is still capable of efficient and economic operation. Moreover, since water can be present in the sulfur dioxide-containing gases treated in accordance with this invention, the application of the invention in present day operations for the treatment of often produced sulfur dioxide-containing gases which contain water, is particularly attractive.

A thermal reducing agent is introduced to the thermal reduction zone to enable thermal reduction to occur. It and the fuel may be the same or different and advantageously suitable reducing agents may contain at least one of carbon monoxide and a hydrocarbon, e.g., methane, ethane, or propane. The thermal reducing agent and the combustion effluent provide a mole ratio hydrogen equivalents to sulfur dioxide of about 1.8 to 2.2. A hydrogen equivalent is defined as the reducing effect of one mole of molecular hydrogen ($H_2$); thus, 0.25 mole of methane, 0.14 mole of ethane, and 1 mole of carbon monoxide are each 1 mole of hydrogen equivalent. The thermal reducing agent can be introduced separately from the fuel and sulfur dioxide-containing gases, or introduced in admixture with the sulfur dioxide-containing gases, or by their combination. The combustion effluent may contain uncombusted or partially combusted components which provides the desired mole ratio of hydrogen equivalents to sulfur dioxide.

The thermal reduction is conducted in the thermal reduction zone to reduce about 50 to 80 percent of the sulfur dioxide to elemental sulfur under certain thermal reduction conditions including the afore stated mole ratios of hydrogen equivalents to sulfur dioxide, temperatures advantageously of about 950° to 1250° C., an essential absence of free or molecular oxygen, and the residence time of the gases undergoing thermal reduction in the thermal reduction zone advantageously of about 0.1 to 4 seconds. An elemental sulfur-containing thermal reduction effluent is emitted from the thermal reduction zone. The thermal reduction effluent provided under the defined thermal reduction conditions can be relatively free of carbon, is compositionally suited for further processing to recover additional sulfur values therefrom as elemental sulfur, and is cooled down after a reduction of at least 50 percent of the sulfur dioxide to elemental sulfur.

The thermal reduction effluent, after being cooled, e.g., to about 240° to 400° C., is subjected to catalytic hydrolysis to convert carbonyl sulfide and carbon disulfide, which are typically present in the thermal reduction effluent, to hydrogen sulfide as well as to reduce some of the sulfur dioxide remaining in the effluent to hydrogen sulfide. The catalytic hydrolysis eliminates side-products of the thermal reduction and the hydrogen sulfide provided by catalytic hydrolysis is utilized in the process of this invention for catalytic reaction with sulfur dioxide to produce elemental sulfur. A hydrogenation and hydrolysis catalyst is employed for the catalytic hydrolysis, and generally the catalyst is an alumina-containing catalyst, for instance, a cobalt and molybdenum-promoted alumina catalyst. The catalyst is provided in catalytically-effective amounts. The effluent from the catalytic hydrolysis can be further cooled to remove elemental sulfur by its condensation and separation prior to the catalytic treatment of the gases to produce elemental sulfur by the reaction between sulfur dioxide and hydrogen sulfide.

The effluent from the catalytic hydrolysis may also be provided with a mole ratio of hydrogen equivalent to sulfur dioxide contained therein of about 1.8 to 2.2, e.g., by adjustment of the hydrogen equivalent content of the gases with reducing agent. Any addition of reducing agent which may be necessary to provide the desired mole ratio of hydrogen equivalent to sulfur dioxide may be conducted before, during or after the condensation of elemental sulfur from the gases.

The cooled effluent having elemental sulfur removed therefrom is then advantageously treated in one or more catalyst reaction zones, e.g., Claus contact zones, in the presence of catalyst to convert sulfur dioxide and hydrogen sulfide to elemental sulfur. The gases passing to the catalytic reaction zones are preferably heated to temperatures suitable for the catalytic reaction, e.g., advantageously of about 200° to 460° C., and sufficient cooling to remove elemental sulfur by condensations is preferably conducted between the catalytic reaction zones in instances in which more than one catalytic reaction zone is employed.

The effluent from the final catalytic reaction zone can be cooled sufficiently, i.e., to a temperature of about 118° to 125° C., to remove elemental sulfur by condensation. The remaining gases, i.e., tail gases, can be subjected to recombustion to convert the sulfur values contained therein to sulfur dioxide.

In further detail, suitable sulfur dioxide-containing gases which may be employed in the process of this invention may contain at least about 10, preferably about 20 to 95, volume percent sulfur dioxide, and particularly advantageous sulfur dioxide-containing gases for use in this invention are those evolved from the regeneration of an absorbent or adsorbent employed in a sulfur dioxide recovery operation. The regeneration gases from adsorbents, e.g., carbon or alumina, in general have a concentration of sulfur dioxide of between about 15 and 40, frequently about 20 to 30, volume percent. The sulfur dioxide concentration of gases from a sulfur dioxide absorbent system, e.g., from the regeneration of an alkali bisulfite solution, may be considerably higher, for instance, about 50 to 95, frequently about 80 to 95, volume percent sulfur dioxide.

The gases introduced into the thermal reduction zone generally have a water vapor content of about 5 to 90, preferably about 20 to 70, volume percent. When the sulfur dioxide-containing gases are obtained by the regeneration of an adsorbent with steam, the regeneration gases may contain substantial amounts of water vapor. Advantageously, in accordance with the process of this invention, the water in the gases need not be condensed and removed prior to introduction of the sulfur dioxide-containing gases into the thermal reduction zone, and accordingly, problems are avoided which are associated with the disposal of water condensate which contains substantial amounts of sulfur dioxide dissolved therein which would otherwise be required.

The sulfur dioxide-containing gases may also contain components in addition to sulfur dioxide and water vapor such as carbon dioxide, carbon monoxide, nitrogen, carbonyl sulfide, carbon disulfide, hydrogen sulfide, mercaptans and the like. When the regeneration of an adsorbent used for desulfurization is conducted under reducing conditions, the sulfur dioxide-containing gas can additionally contain reducing agents such as hydrogen and/or hydrocarbon. Regeneration gases from adsorbents or absorbents used for sulfur dioxide recovery operation may contain small amounts of sulfur trioxide which may be more corrosive than sulfur dioxide. Accordingly, it is desired that the sulfur dioxide-containing gases be maintained at temperatures sufficiently high to abate undue corrosion. The regeneration gases may, for instance, be cooled, compressed, e.g., by a mechanical blower, to a desired pressure for the thermal reduction, and reheated. Excessively high temperatures of the regeneration gases should be avoided to abate undue stress on the compression equipment. Also, condensation of water during the transit of the regeneration gases to the thermal reduction zone should be avoided. The sulfur dioxide-containing gas may also contain fine solid particulate material, i.e., dust, if not previously separated. Preferably, the solids are removed from the gases by, for instance, filters. The solids removal can be effected upstream of the compression equipment to reduce wear on the equipment.

The sulfur dioxide-containing gases are introduced into a thermal reduction zone and are subjected to thermal reduction conditions including a temperature preferably in the range of about 950° to 1250° C., and more preferably at about 1050° C. to 1120° or 1150° C. At temperatures below about 950° C., little, if any, sulfur is formed. Above 1050° C., the rate of sulfur formation rapidly increases. Temperatures above about 1250° C. may be uneconomical since additional fuel must be combusted to maintain the higher thermal reduction temperatures. The optimum temperature range, i.e., the temperature range in which a high conversion of sulfur dioxide is effected with a minimal consumption of fuel and reducing agent, depends on the type of reducing agent and on the composition of the sulfur dioxide-containing gases. With a given reducing agent and fuel and a given composition for the sulfur dioxide-containing gases, the optimum temperature range for the thermal reduction is that which provides a desired degree of sulfur dioxide conversion with minimal requirements of reducing agent and fuel. The thermal reduction temperatures are maintained by the combustion of fuel in the thermal reduction zone with oxygen-containing gas. The temperature in the thermal combustion zone can be regulated by the amount of fuel combusted therein; however, the achievement of temperatures in the thermal combustion zone may also be influenced by the temperature of the sulfur dioxide-containing gases being introduced into the thermal reduction zone. Accordingly, the sulfur dioxide-containing gases can be preheated, e.g., to a temperature generally within the range of about 50 to 600° C. By such preheating, the fuel consumption may be reduced. The preheating of the sulfur dioxide-containing gases can be effected by heat exchange, e.g., indirect heat exchange with, for instance, effluent from the thermal reduction zone.

The thermal reduction is conducted in the presence of reducing components such as reducing agent introduced into the thermal reduction zone and, possibly, uncombusted or partially combusted components from the fuel combustion in the thermal reduction zone. The reducing agent is preferably gaseous and contains reducing compounds such as hydrogen, carbon monoxide, and/or hydrocarbon, e.g., a hydrocarbon containing 1 to about 5 carbon atoms. Suitable reducing agents include the foregoing reducing compounds or their mixtures, or gases containing one or more of the reducing compounds such as coke oven gases, exhaust gases from petroleum refineries employing catalytic reforming, suitable town gas, suitable natural gas and other suitable industrial exhaust gases. If, for instance, the regeneration of an adsorbent used in the desulfurization operation is conducted under reducing conditions, the sulfur dioxide-containing gases may contain reducing agent, e.g., hydrogen, which may provide at least a portion of the reducing agent requirements for the thermal reduction. Temperatures of 1000° C. and above are preferably employed when a hydrocarbon-containing material is employed as the reducing agent to enhance thermal cracking of at least a portion of the hydrocarbon to provide hydrogen. Thus, at least the reduction is partially conducted using hydrogen as a reducing compound.

The thermal reducing agent may be, for instance, admixed and introduced into the thermal reduction zone with the sulfur dioxide-containing gases or introduced separately from the sulfur dioxide-containing gases and from the fuel for the thermal combustion, or their combination. Generally, the partial combustion of fuel, i.e., the formation of reducing compounds from the fuel, can only be employed to a limited degree, and thus can provide only a minor portion of the total reducing compound requirement for thermal reduction, since there may be a tendency to form carbon which might give the sulfur product a dark color. Preferably, the reducing agent is supplied by means other than the partial combustion of fuel in the thermal reduction zone. The reduction potential in the thermal reduction zone is influenced by the ratio of the reducing compounds to sulfur dioxide. The reducing agent, which is introduced downstream from the combustion of the fuel, is advantageously introduced at an elevated temperature, e.g., by preheating it to about 50° to 600° C., in order to facilitate maintaining thermal reducing temperatures in the reduction zone. The reducing agent may be preheated separately from the sulfur dioxide-containing gases or, when in admixture with the sulfur dioxide-containing gases, preheated together.

The amount of total reducing compounds, i.e., the amount of reducing agent and the amount, if any, of uncombusted or partially combusted fuel values, can be expressed in terms of the mole ratio of hydrogen equivalents to sulfur dioxide. In accordance with this invention the mole ratio of hydrogen equivalents to sulfur dioxide provided for thermal reduction is maintained between about 1.8 to 2.2. If the ratio remains below about 1.8, the mole ratio of hydrogen sulfide to sulfur dioxide in the effluent from the thermal reduction zone may not be as desirable for treatment of the gases in a downstream Claus contact reactor, and a readjustment of the mole ratio of hydrogen sulfide to sulfur dioxide may be necessary. If the mole ratio of hydrogen equivalents to sulfur dioxide is higher than about 2.2, the discharged gases from the thermal reduction zone may contain unused reducing agent, and such unused reducing agent is generally combusted in an afterburner subsequent to further treatment of the thermal reduction effluent to recover the elemental sulfur. By maintaining the mole ratio of hydrogen equivalents to sulfur dioxide within the range of about 1.8 to 2.2, a good yield of sulfur and a gas having an advantageous mole ratio of hydrogen sulfide to sulfur dioxide for further processing in accordance with the invention can be obtained.

The thermal reduction temperatures are provided by the combustion of fuel in the thermal reduction zone. The fuel may be a fluid, i.e., gaseous or liquid, fuel and is burned with an oxygen-containing gas. The fuel may be the same as the reducing agent or may be different. A combustible gas preferably serves as the fuel; however, a liquid hydrocarbon, e.g., heating oil, may alternatively be employed. Thus, commercially-attractive fuels can be employed in accordance with this invention. The oxygen-containing gas can be air, air enriched with oxygen, oxygen, or an industrial gas containing oxygen. Preferably, the fuel is combusted with a stoichiometric amount of oxygen for complete combustion, i.e., combustion to water and to carbon dioxide if carbon is present in the fuel, so that the combustion gases contain no or an insignificant amount, e.g., less than about 0.2 volume percent, of oxygen. The hot combustion gases may generally be within a temperature range of about 1100° to 2000° C., preferably about 1200° to 1600° C., prior to the addition of the reducing agent and/or sulfur dioxide-containing gases. Besides using direct combustion in the thermal reduction zone or preheating of the sulfur dioxide-containing gases and the reducing agent, the heat for the thermal reduction may also be provided by, for instance, indirect heat exchange to the thermal reduction zone by means of hot flue gases or by electric heating.

The sulfur dioxide-containing gases, and preferably the reducing agent, are advantageously admixed with the combustion gases in the thermal reduction zone when less than about 0.2 volume percent of free or molecular oxygen remain in the combustion gases, e.g., the admixing of the sulfur dioxide-containing gases and possibly the reducing agent may occur sufficiently downstream of the initiation of the combustion of the fuel such that the combustion gases contain less than about 0.2 volume percent of free or molecular oxygen. Thus, the thermal reduction is conducted in the essential absence of free or molecular oxygen, i.e., by the time that the sulfur dioxide-containing gases, and the reducing agent, reach thermal reduction temperatures, at most 0.2 volume percent oxygen should be present in the mixture. The admixing of the sulfur dioxide-containing gases, the reducing agent if separately introduced, and the hot combustion gases provides the thermal reduction temperatures which enable the thermal reduction to occur. Advantageously, the mixing of the sulfur dioxide-containing gases and the hot combustion gases may be conducted in two stages within the thermal reduction zone. The first stage is a preliminary mixing stage wherein the sulfur dioxide-containing gases, the reducing agent, and the hot combustion gases are combined. The preliminary mixing stage is followed by a subsequent remixing zone which serves to promote more intimate mixing of the components and to provide more uniform temperatures across the cross-section of the thermal reduction zone. The two stage mixing may therefore enable the thermal reduction to proceed to the desired degree of completion within a smaller volume of reactor as well as provide a more precise control of the temperature in the reduction zone. The subsequent remixing may be accomplished by placing a mechanical restriction in the thermal reduction zone such as a perforated wall which results in a pressure drop and promotes mixing.

In a preferred aspect of this invention, the sulfur dioxide-containing gases and the reducing agent are admixed in a premixing zone prior to being introduced into the thermal reduction zone. This may be accomplished by simply seaparately introducing the sulfur dioxide-containing gases and the reducing agent into a conduit which transports the gases to the thermal reduction zone and which is sufficiently long to achieve a desired degree of mixing. Especially in large installations, more than one inlet port for the sulfur dioxide-containing gases and the reducing agent can be provided to enhance the combination of the gases with the hot combustion gases.

The following reactions may occur during the thermal reduction which proceed toward equilibrium:

$$CH_4 + O_2 \rightleftarrows CO + H_2 + H_2O$$

$$2 SO_2 + CH_4 \rightleftarrows 2/n\, S_n + CO_2 + 2 H_2O$$

$$SO_2 + 2 H_2 \rightleftarrows 2 H_2O + 1/n\, S_n$$

$$SO_2 + 2 CO \rightleftarrows 2 CO_2 + 1/n\, S_n$$

$$2 H_2S + SO_2 \rightleftarrows 3/n\, S_n + 2 H_2O$$

$$2 H_2 + S_2 \rightleftarrows 2 H_2S$$

$$CO_2 + H_2 \rightleftarrows H_2O + CO$$

$$2 CO + S_2 \rightleftarrows 2 COS$$

$$2 COS \rightleftarrows CO_2 + CS_2$$

The thermal reduction converts a portion, advantageously about 50 to 80 percent, of the sulfur dioxide to elemental sulfur, and a portion of the sulfur dioxide is converted to hydrogen sulfide. By the process of this invention hydrocarbon may be combusted in the thermal reduction zone at relatively moderate temperatures yet the resultant, separated elemental sulfur product may not exhibit the dark coloring which would be expected if significant amounts of elemental carbon were present. The presence of carbon-containing compounds provided by the fuel and/or reducing agent in the thermal reduction results, as illustrated above, in the formation of carbonyl sulfide and carbon disulfide. The formation of these compounds is no disadvantageous in the process of this invention since they may be readily converted by hydrolysis to hydrogen sulfide which can conveniently be converted to elemental sulfur by, for instance, the Claus process. In any event, the formation of carbonyl sulfide and carbon disulfide serves to reduce the sulfur in sulfur dioxide.

The velocity of the gases passing through the thermal reduction zone may conveniently be in the range of about 1 to 25, preferably about 3 to 15, meters per second. The residence time of the gases undergoing thermal reduction in the thermal reduction zone generally ranges from about 0.1 to 4, preferably about 0.5 to 2, seconds. The residence time should be sufficient to enable about 50 to 80 percent of the sulfur dioxide to be reduced to elemental sulfur. In accordance with this invention longer residence times are generally unnecessary in view of the mole ratio of hydrogen equivalents to sulfur dioxide employed and the subsequent catalytic processing of the thermal reduction effluent.

The effluent gases from the thermal reduction zone are treated to recover additional elemental sulfur therefrom. The gas leaving the thermal combustion chamber may contain, among other components, carbonyl sulfide and carbon disulfide. These components are desirably catalytically hydrolyzed to provide hydrogen sulfide which in turn may be converted with sulfur dioxide to elemental sulfur in accordance with the Claus process. Generally, since the sulfur dioxide-containing gases fed to the thermal reduction zone contain water vapor, sufficient water vapor is present in the gases exiting the thermal reduction zone for the hydrolysis of these compounds. By the process of this invention providing a mole ratio of hydrogen equivalents to sulfur dioxide within the range of about 1.8 to 2.2, hydrogen equivalents are available in the effluent and catalytic hydrogenation may also occur. The conversions of the carbonyl sulfide and carbon disulfide may proceed in accordance with the following reactions at temperatures generally in the range of about 240° to 400° C., preferably about 250° to 350° C., over a suitable hydrogenation and hydrolysis catalyst, for instance, a cobalt and molybdenum-containing catalyst, e.g. a cobalt sulfide/molybdenum sulfide catalyst:

$$COS + H_2O \rightleftharpoons CO_2 + H_2S$$

$$COS + H_2 \rightleftharpoons CO + H_2S$$

$$CS_2 + 2 H_2O \rightleftharpoons CO_2 + 2 H_2S$$

Under these hydrogenation and hydrolysis conditions, the hydrogen sulfide and sulfur dioxide may also be converted to elemental sulfur in accordance with the well known Claus process.

In a preferred embodiment of this invention, the mole ratio of hydrogen equivalents to sulfur dioxide contained in the gases immediately upstream of the catalytic hydrolysis is again advantageously adjusted to between about 1.8 and 2.2 by the addition of reducing agent. The adjustment of the mole ratio of hydrogen equivalents to sulfur dioxide serves to provide a desirable hydrogen sulfide to sulfur dioxide mole ratio, i.e., about 2:1, for the Claus reactions in the downstream Claus contact stages as well as enhance conversion to elemental sulfur. The reducing agent, if preheated, may serve to heat the gases which have been cooled to condense elemental sulfur therefrom to catalytic hydrolysis temperatures, and/or the combined gases may be reheated. The reheating can be effected by indirect heat exchange or by direct heat exchange by, for instance, adding hot gases from the thermal reduction zone or combusting fuel. The presence of uncombusted fuel values, providing a mole ratio of hydrogen to sulfur dioxide of about 1.8 to 2.2 is maintained, poses no significant problems to the processing of the gases, especially when the tail gases from the process are subjected to afterburning.

At least one, and preferably two, subsequent processing stages, e.g. Claus processing stages, are employed for treating the gases from the catalytic hydrolysis to recover additional sulfur from any remaining hydrogen sulfide and sulfur dioxide contained therein. the Claus processing units may be conventional and frequently the catalytic converion is at a temperature of about 200° to 460° C., e.g., about 200° to 280° C. using a Claus catalyst, for instance, a cobalt sulfide/molybdenum sulfide catalyst. The gases from which elemental sulfur has been separated may therefore have to be reheated to Claus catalytic conversion temperatures.

In the first Claus contact stage, in addition to the Claus reaction between hydrogen sulfide and sulfur dioxide to form elemental sulfur and water, hydrolysis of any remaining carbonyl sulfide and carbon disulfide is favored by the water vapor content of the gases which in part is provided by the water content of the sulfur dioxide-containing gases which are treated. Also additional hydrogenation of the sulfur dioxide to hydrogen sulfide may occur in the first Claus contact stage.

The gases exiting each Claus contact stage are preferably sufficiently cooled to condense out and separate elemental sulfur. Generally, the sulfur condensation takes place at a temperature in the range of about 118° to 125° C. and it is desired to obtain a temperature as close to about 118° C. as possible to enhance elemental sulfur recovery. Temperatures below about 118° C. are generally avoided since solid sulfur may form which could block or damage the operational equipment. In order to facilitate operation of the Claus contact stages, the interstage cooling to condense and separate elemental sulfur may be to a lower temperature between each succeeding stage since the partial pressure of the sulfur in the gases is decreased after each progressive downstream stage.

The gases from the final Claus catalytic conversion stage may be cooled, e.g., to about 118° to 125° C., and the elemental sulfur separated. The effluent gases from the sulfur separation may be combusted in an afterburner to convert the sulfur values, e.g., sulfur, hydrogen sulfide, carbonyl sulfide, carbon disulfide, carbon monoxide, etc., contained therein to sulfur dioxide and other products of complete combustion. The exhaust gases containing sulfur dioxide may conveniently in part be admixed with the sulfur dioxide-containing gases fed to the thermal reduction zone, or they may be delivered to a sulfur dioxide recovery unit for recovery of sulfur dioxide. The latter procedure is particularly attractive when the process of this invention is used in conjunction with a sulfur dioxide recovery unit. Frequently, the gases exiting the after-burner may contain only about 0.6 to 0.9 volume percent sulfur dioxide.

A further aspect of this invention pertains to the regeneration of the catalyst in the catalytic hydrolysis stage and the Claus contact stages. Regeneration of the catalyst may be accomplished by contacting the catalyst with a reducing gas having a mole ratio of hydrogen equivalents to sulfur dioxide of about 2.0 to 3.0 at a temperature of about 350° to 500° C. for about 8 to 36 hours, preferably about 12 to 24 hours. The activity of the catalyst employed in the catalytic units decreases in activity with use; therefore, periodic regeneration of the catalyst is desired. The regeneration can be effected with a gas having increased reduction potential as compared to the conventional gases used in the Claus process, and these gases may conveniently be obtained when the thermal reduction is operated in the presence of excesses of the reducing agent. Conveniently, the regeneration temperatures can be obtained by by-passing an appropriate portion of the thermal reduction effluent around the, e.g., waste heat boiler used to cool the effluent, and recombining it with the effluent from the waste heat boiler which flows to the catalytic units. Consequently, the reducing gas used for regeneration may be rich in hydrogen sulfide. Upon completion of the regeneration, normal operation of the process is resumed with the mole ratio of hydrogen equivalents to sulfur dioxide being maintained at about 1.8 to 2.2. The regeneration may also be conducted by using effluent gases from the thermal reduction which have been enriched with water or by using hydrogen. When hydrogen is used for regeneration, the operation of the thermal reduction is not required to effect regeneration.

Also in accordance with the aspect of this invention pertaining to regeneration of the catalyst employed in the catalytic units wherein more than one Claus contact stage is employed, the reducing gas under the conditions described above can be introduced to one or more of the Claus contact stages while the gases from the catalytic hydrolysis conversion are passed to at least one of the Claus contact steps. By alternate changing of the Claus contact stages from reaction to regeneration and back, uninterrupted operation of the plant may be achieved. Desirably, the Claus contact stages, when between reaction and regeneration cycles, are maintained at a temperature of at least about 150° C. to avoid any blockage of the catalyst. This temperature can be maintained by, for instance, passing an inert, hot gas stream through the catalyst bed or by indirect heating of the catalyst bed. Maintaining the catalyst at such temperatures while not in use is especially beneficial in flue gas desulfurization plants, e.g., as used in a power plant, where the catalyst may need to be put on stream only during times of peak power output.

A particularly advantageous thermal reduction furnace for use with this invention may be an essentially cylinder-shaped, fireproof-lined reduction furnace with a combustion muffle attached to the front side of the furnace. The combustion muffle is provided with separate ports for supplying the fuel and oxygen-containing gas. Downstream from the fuel and oxygen-containing gas ports are supply ports for the reducing agent and sulfur dioxide-containing gases. The reducing agent may be introduced separately or may be introduced in admixture with the sulfur dioxide-containing gases. Inherently through the design of the furnace, a certain separation between the combustion and thermal reduction is achieved. This enables the temperature of the combustion and of the thermal reduction to be more easily maintained within the desired ranges than if the fuel, oxygen, reducing agent and sulfur dioxide-containing gases were supplied at essentially the same point into the furnace.

The reduction furnace can be provided with a mixing wall which is perpendicular to the flow of the gases in the furnace and is downstream from the introduction of the reducing agent and sulfur dioxide-containing gases. The mixing wall desirably comprises a plurality of openings through which the gases pass in order to effect a pressure drop and the desired mixing. Generally, the pressure drop across the mixing wall is about 25 to 250, preferably about 50 to 150, millimeters of water. The combustion muffle may be provided with a device such as a mixing wall to promote mixing of the fuel and oxygen-containing gas, thereby enhancing combustion of the fuel.

The invention may be further understood by reference to the drawings in which.

Figure 1:
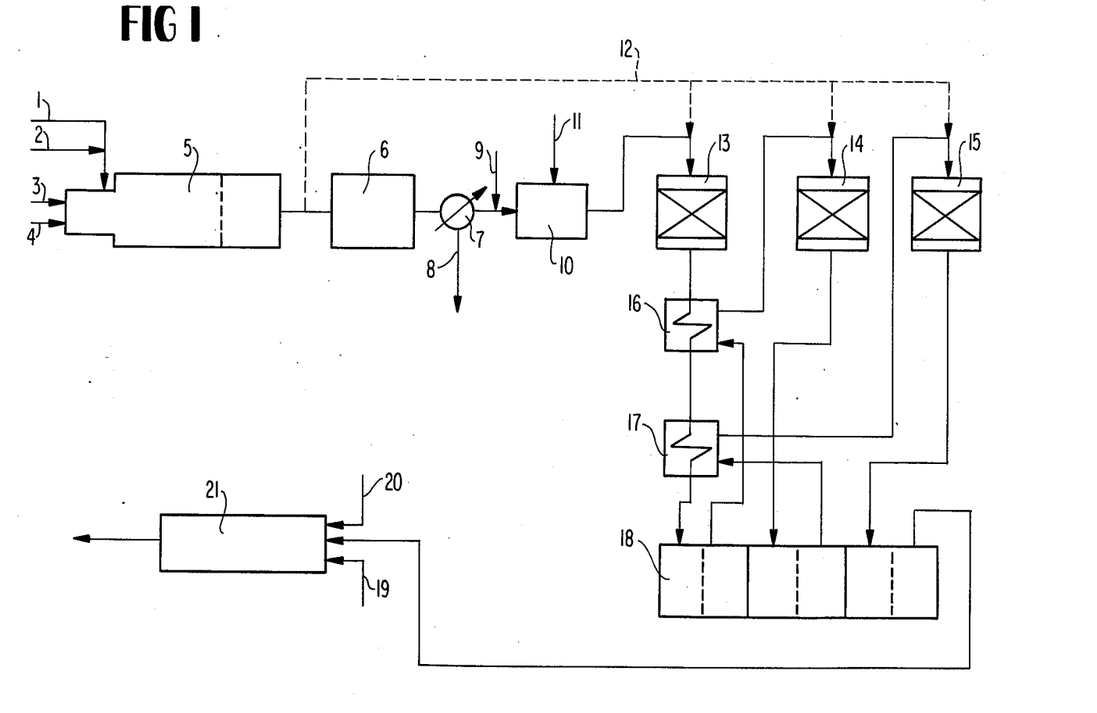
FIG. 1 is a schematic flow diagram of the process of this invention for the production of sulfur from a sulfur dioxide-containing gas.

Sulfur dioxide-containing gas from which sulfur is to be recovered is supplied to thermal reduction chamber 5 by line 1. The sulfur dioxide-containing gas may, for instance, be obtained from a cyclic sulfur dioxide recovery unit wherein sulfur dioxide is removed from waste gases by a suitable absorption or adsorption agent, the absorption or adsorption agent containing the recovered sulfur dioxide is regenerated by desorbing the sulfur dioxide, and the regenerated absorption or adsorption agent is returned for further recovering of sulfur dioxide from waste gases. The reducing agent, for instance, a vaporous hydrocarbon, e.g., methane, is supplied by line 2 to line 1 where it is mixed with the sulfur dioxide-containing gas and passed to the reduction chamber 5. As the sulfur dioxide-containing gas and vaporous hydrocarbon are being fed to the reduction chamber, a burner in the reduction chamber is being provided with fuel, for instance, a vaporous hydrocarbon, e.g., methane, from line 3 and oxygen-containing gas, e.g., air, from line 4. The effluent from the burner passes through the thermal reduction chamber in association with the sulfur dioxide-containing gas and the reduction agent from line 1. In the thermal reduction chamber the sulfur dioxide is reduced, for the most part, to elemental sulfur and hydrogen sulfide. The gas may also contain carbonyl sulfide, carbon disulfide, and sulfur dioxide. The gas mixture leaving the thermal reduction chamber 5 is passed to and cooled in waste heat boiler 6 and to heat exchanger 7 to provide an effluent gas having a suitable temperature for catalytic conversion of remaining sulfur values in the gas to elemental sulfur. The cooling in heat exchanger 7 may provide the coalescing of elementary sulfur, and line 8 is provided to withdraw liquid sulfur which may be separated.

In order to adjust the mole ratio of hydrogen equivalents to sulfur dioxide, reducing agent, e.g., hydrogen, supplied by line 9, is added to the cooled gases. The temperature of the gases is increased in heater 10 by means of a burner. Fuel, e.g., natural gas, is supplied to the burner by line 11. The reheated gases pass to first catalytic converter 13 for catalytic hydrolysis and the carbonyl sulfide and carbon disulfide are reacted with water vapor which are present in the gas to provide hydrogen sulfide which in turn reacts with sulfur dioxide to provide elemental sulfur. A portion of the sulfur dioxide contained in the gas may be hydrogenated to hydrogen sulfide. The gases are withdrawn from catalytic converter 13 and are cooled in heat exchangers 16 and 17 to a temperature sufficiently low to condense sulfur, i.e., generally to a temperature of less than about 135° C. The condensed sulfur is separated from the gases and collected in a first chamber of separator 18. The gases from the first chamber of the separator are used as the cooling medium in heat exchanger 16 and are heated to a temperature suitable for the subsequent catalytic conversion of sulfur dioxide and hydrogen sulfide to elemental sulfur in the first Claus contact stage 14. If the gases passing to the second chamber are too warm to permit the condensation of elemental sulfur in the separator, the gases may be cooled by indirect heat exchange (not shown) to a suitable temperature prior to entering the separator. The elemental sulfur in the gases exiting the first Claus contact stage 14 is separated in the second chamber of separator 18. The gases from the second chamber of separator 18 are reheated in heat exchanger 17 while serving as the cooling medium therein, and then are passed to final Claus contact stage 15 for the conversion of sulfur dioxide and hydrogen sulfide to provide elemental sulfur. The gases from the final Claus contact stage are cooled (not shown), if necessary to provide for the condensation of elemental sulfur, and passed to the third chamber of separator 18 to remove condensed elemental sulfur therefrom. The exhaust gases from the separator enter after-burner 21 to eliminate combustible components from the exhaust gases such as hydrogen sulfide and elemental sulfur. Hydrocarbon fuel, e.g., methane, and oxygen-containing gas, e.g., air, are supplied to the after-burner by lines 19 and 20, respectively, to provide heat and sufficient oxygen to effect the oxidation of combustible sulfur components. The exhaust gases from the after-burner may, for example, contain only about 0.6 to 0.9 volume percent sulfur dioxide, and may conveniently be supplied with the waste sulfur dioxide-containing gas to the sulfur dioxide recovery unit.

While the gaseous effluent from the first and second chambers of separator 18 are illustrated as being heated to suitable temperatures for the subsequent catalytic conversions in the heat exchangers, additional heating may be desirable, or alternatively another cooling medium is employed instead of the gases from the separator, and the heat may be provided by, for instance, direct heat exchange with a gas burner positioned within the pipe. Suitable burners include burners which combust methane, natural gas, or other heating gas with a supplemental oxygen-containing gas.

The catalyst in catalytic reactors 13, 14, and 15 can be regenerated by supplying a reducing gas at a temperature above about 350° C. For this purpose, gas from the thermal combustion furnace 5 is passed via line 12 shown as a dotted line to the catalytic reactors 13, 14, and 15 and is mixed with gas from heat exchanger 7 to which hydrogen supplied by line 9 is added. The temperature of the reducing gas can be established by the ratio of the mixture of the gases. More than two Claus contact stages can be provided such that one part can be in operation while the other part is being regenerated. The regeneration can also be effected with the use of a heated hydrogen stream while the thermal reduction is shut down.

Figure 2:
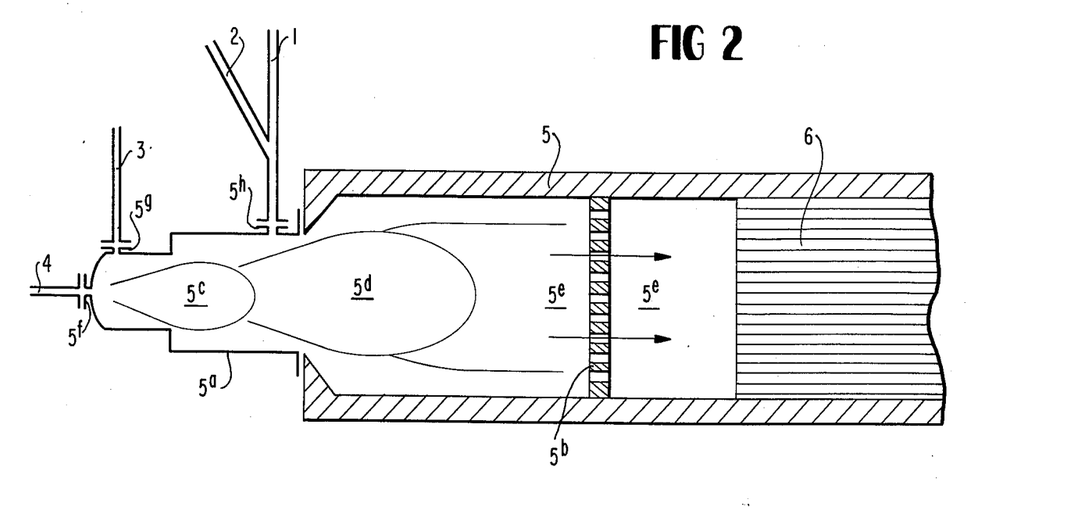
FIG. 2 is a diagramatic representation of a furnace for thermal reduction in accordance with this invention.

With reference to FIG. 2, the reduction chamber, or furnace, 5 for the thermal reduction is shown in more detail. The furnace has a cylindric section and, at the front side, it is equipped with a combustion muffle $5^a$ to which the fuel or the air, respectively, is supplied through lines 3 and 4. Downstream of lines 3 and 4, the sulfur dioxide-containing gas, which is to be reduced, is introduced through line 1. Before being introduced, the sulfur dioxide-containing gases are mixed with the gaseous reducing agent as, for instance, methane and/or hydrogen supplied by line 2. In the combustion muffle, oxidation zone $5^c$ is formed in which essentially only the fuel burns. The oxidation zone $5^c$ is followed by the reduction zone $5^d$ in which sulfur dioxide-containing gases from line 1 are mixed with the hot combustion gases from the oxidation zone $5^c$. The sulfur dioxide-containing gases and the reducing agent are simultaneously heated to the reduction temperature and the reduction of sulfur dioxide to sulfur and hydrogen sulfide is initiated. In subsequent remixing zone $5^e$, the gases are further admixed due to the presence of perforated mixing wall $5^b$, and additional sulfur dioxide is converted to elementary sulfur and hydrogen sulfide. The pressure drop in the thermal reduction zone is essentially caused by the mixing wall. The concentration of elementary oxygen in the reduction zone $5^d$ is extremely low and, at a maximum, is 0.2 volume percent; the consumption of the reducing agent by combustion with oxygen is, therefore, negligible. In order to intensify the combustion in the combustion zone $5^c$, combustion muffle $5^a$ can be provided with devices (not shown) to assist in mixing the gases. The gases which have essentially completed possible reactions under the thermal reduction conditions flow to the waste heat boiler 6 in which the temperature is lowered from about 1100° C. to, for instance, 350° C.

The reducing agent and the sulfur dioxide-containing gases can be mixed in a premixing device (not shown) separate from the furnace 5. Conventional gas mixing units such as injectors, jet mixers or mixing chambers, can be used to promote mixing. The outlet of this special mixing unit can be connected with port $5^h$ of furnace 5.

The following example is illustrative of this invention. All parts and percentages are by weight unless otherwise indicated.

A sulfur dioxide-containing gas is obtained from a sulfur dioxide recovery unit. In the sulfur dioxide recovery unit, an effluent from a carbonaceous, sulfur-containing fuel combustion is contacted with coke which is activated to adsorb sulfur dioxide with the formation of sulfuric acid at the coke surface. The coke having the adsorbed sulfuric acid is heated to reform sulfur dioxide from the adsorbed acid and regenerate the coke for further contact with the combustion effluent. The sulfur dioxide-containing gases liberated in the coke regeneration stage contain about 21 volume percent sulfur dioxide and about 20 volume percent water vapor. Elemental sulfur is recovered from the sulfur dioxide-containing gases in accordance with the process as outlined with respect to the drawing, and this example will, therefore, be described with reference to the drawings and their description.

The sulfur dioxide-containing gases are fed via line 1 into thermal reduction chamber 5 at a rate of 2920Nm³/h with 754Nm³/h of coke-oven gas containing 57 volume percent hydrogen, 22 volume percent methane, 2.6 volume percent ethane and light hydrocarbons, the balance being carbon dioxide and nitrogen from line 2 at a temperature of 150° C. The mole ratio of hydrogen equivalents to sulfur dioxide is 2.1. The temperature in the reduction chamber is maintained at about 1070° to 1110° C. through combustion of coke-oven gas with air supplied to the burner through lines 3 and 4. Sulfur dioxide in the sulfur dioxide-containing gases is largely reduced, thereby providing effluent gases containing mainly elemental sulfur, sulfur dioxide and hydrogen sulfide. The gases leaving the thermal reduction chamber are cooled to about 300° C. in waste heat boiler 6 and heat exchanger 7 whereby 437 Kg/h of elemental sulfur are condensed and drawn off corresponding to a yield of about 50 percent. Approximately 10Nm³/h of hydrogen are added to the cooled gases which are reheated in chamber 10 to about 325° C. by indirect heat exchange. The reheated gases are passed to the first catalytic converter 13 in which a cobalt-/molybdenum sulfide supported on bauxite catalyst is employed. The catalytic conversion proceeds at about 325° C. The effluent from the first catalytic converter is cooled in two stages to 150° and 135° C. in heat exchangers 16 and 17, and elemental sulfur is separated from the gases in the first chamber of separator 18. The gases are then treated in the second catalytic converter 14 employing a Claus catalyst at a temperature of about 240° C., cooled to 135° C., and elemental sulfur is recovered therefrom in the second chamber of separator 18. The gases from the second chamber are passed to the final catalytic converter 15 also employing a Claus catalyst and the catalytic conversion proceeds at about 210° C. The effluent from the final catalytic converter is cooled to 135° C. and passes to the third chamber of separator 18 to separate elemental sulfur therefrom. As described in the drawing, the gaseous effluent from the third chamber of separator 18 is treated in the afterburner 21. The yield is 810 kilograms per hour of elemental sulfur having a bright color. The sulfur product is analyzed to be about 99.95 percent pure. The overall yield of sulfur is 92.5 percent.

In order to regenerate the Claus contact stages, the rate of coke-oven gas through line 2 is increased to 1042Nm³/h with the same rate of sulfur containing gas, corresponding to a mole ratio of sulfur-containing gas, corresponding to a mole ratio of hydrogen equivalent to sulfur dioxide of 2.9. 22.5 Volume percent of the hot reaction gas by-passes waste heat boiler, heat exchanger and combustion chamber (6–11 in FIG. 1), is conducted through dashed line 12 and recombined with the main gas stream before the contact stages. The recombined gas has a temperature of 480° C. and performs the regeneration of the catalyst. After a regeneration time of 24 hours, the rate of coke-oven gas through line 2 is again decreased to 754Nm³/h.

It is claimed:

1. A process for producing elemental sulfur from sulfur dioxide-containing gases having at least about 10 percent sulfur dioxide therein comprising introducing a carbonaceous fuel and an oxygen-containing gas into a thermal reduction zone, said oxygen-containing gas being up to about a sufficient amount on a stoichiometric basis for complete combustion of the fuel, combusting said carbonaceous fuel with said oxygen-containing gas within the thermal reduction zone to provide combustion gases having temperatures at about 1100° to 2000° C. and to provide sufficient heat to maintain thermal reduction temperatures in the thermal reduction zone;

introducing a reducing agent capable of reducing sulfur dioxide to sulfur in the thermal reduction zone;

introducing into the thermal reduction zone, and commingling said sulfur dioxide-containing gases with the combustion gases wherein said combusting has proceeded sufficiently such that the combustion gases contain less than about 0.2 volume percent free or molecular oxygen, and wherein the mole ratio of hydrogen equivalents contained in said reducing agent and in said combusted gases to sulfur dioxide provided for thermal reduction in the thermal reduction zone is about 1.8 to 2.2;

thermally reducing about 50 to 80 percent of the sulfur dioxide in the sulfur dioxide-containing gases to elemental sulfur in the thermal reduction zone under reducing conditions including temperatures of about 950° to 1250° C. and an essential absence of free or molecular oxygen to produce an elemental sulfur-containing thermal reduction effluent wherein the gas velocity in the thermal reduction zone is about 1 to 25 meters per second and the residence time of the sulfur dioxide-containing gases in the thermal reduction zone is about 0.1 to 4 seconds;

cooling the thermal reduction effluent to about 240° to 400° C.;

subjecting the cooled thermal reduction effluent to catalytic hydrolysis in the presence of a catalytically-effective amount of a hydrogenation and hydrolysis catalyst to hydrolyze carbon disulfide and carbonyl sulfide contained in the thermal reduction effluent to hydrogen sulfide and reduce at least part of the sulfur dioxide present in the thermal reduction effluent to hydrogen sulfide; and cooling the hydrolyzed thermal reduction effluent to about 118° to 170° C. to condense and separate elemental surface from the gases.

2. The process of claim 1 wherein the thermal reduction temperature is about 1050° to 1250° C., and the reducing agent comprises at least one member of the group consisting of carbon monoxide and hydrocarbon of 1 to about 5 carbon atoms.

3. The process of claim 1 wherein a restriction in the flow of the gases in the thermal reduction zone is provided to enhance mixing of the gases.

4. The process of claim 1 wherein the cooled, hydrolyzed thermal combustion effluent is reheated to a temperature of about 200° to 460° C. and the reheated gases are catalytically treated in the presence of catalyst in at least one separate Claus conversion stage to convert sulfur dioxide and hydrogen sulfide contained in the reheated gases to elemental sulfur.

5. The process of claim 4 wherein the sulfur dioxide-containing gases contain about 5 to 90 volume percent $H_2O$.

6. The process of claim 4 wherein the cooled gases prior to catalytic treatment in at least one separate Claus conversion stage are adjusted to have a mole ratio of hydrogen equivalents to sulfur dioxide of about 1.8 to 2.2.

7. The process of claim 4 wherein at least one of the reducing agent and sulfur dioxide-containing gases is preheated to a temperature of 50° to 600° C. before being introduced into the thermal reduction zone.

8. The process of claim 7 wherein the reducing agent and the sulfur dioxide-containing gases are premixed before being introduced into the thermal reduction zone.

9. The process of claim 8 wherein the thermal reduction temperature is about 1050° to 1120° C., the hot combustion gases are at a temperature of about 1200° to 1600° C., the $H_2O$ content of the sulfur dioxide-containing gases is about 20 to 70 volume percent, the gas velocity in the thermal reduction zone is about 3 to 15 meters per second, and the residence time of the sulfur dioxide-containing gases in the thermal reduction zone is about 0.5 to 2 seconds.

10. The process of claim 9 wherein solids are removed from the sulfur dioxide-containing gases prior to being introduced into the thermal reduction zone.

11. The process of claim 1 wherein the sulfur dioxide-containing gases are regeneration gases from a gas desulfurization plant using an absorbent or absorbent and contain about 5 to 90 volume percent $H_2O$, the regeneration gases are maintained at a temperature sufficiently high to prevent corrosion and are compressed to the required process pressure by a blower.

12. The process of claim 1 wherein the mole ratio of hydrogen equivalents to sulfur dioxide in the effluent from the thermal reduction is maintained at about 1.8 to 2.2 prior to the catalytic hydrolysis by the addition of reducing agent.

13. The process of claim 12 wherein the catalytic hydrolysis temperature is about 250° to 350° C. and a cobalt and molybdenum-containing catalyst is employed.

14. The process of claim 4 wherein at least two Claus conversion stages are employed, and gaseous effluent from the final Claus conversion stage is cooled to condense and separate elemental sulfur and is then combusted in an after-burner.

15. The process of claim 4 wherein the catalyst for the catalytic hydrolysis or Claus conversion stages is regenerated with a reducing gas having a mole ratio of hydrogen equivalents to sulfur dioxide of about 2 to 3 at a temperature of about 350° to 500° C. for a period of 8 to 36 hours.

16. The process of claim 15 wherein the reducing gas is effluent from the thermal reduction zone which is enriched with hydrogen.

17. The process of claim 15 wherein at least two Claus conversion stages are provided and at least one of the Claus conversion stages is being regenerated and at least one of the Claus conversion stages is being employed to convert hydrogen sulfide and sulfur dioxide to elemental sulfur.

18. The process of claim 9 wherein the sulfur dioxide-containing gases are regeneration gases from a gas desulfurization plant using an absorbent or adsorbent and contain about 5 to 90 volume percent water, the regeneration gases are maintained at a temperature sufficiently high to prevent corrosion and are compressed to the required process pressure by a blower.

19. The process of claim 9 wherein the thermal reduction zone is provided with a restriction to the flow of gases to enhance mixing of the gases.

20. The process of claim 19 wherein the restriction to the flow of the gases provides a pressure drop of about 25 to 250 millimeters of water.

* * * * *